(12) United States Patent
Bullock et al.

(10) Patent No.: US 9,574,063 B2
(45) Date of Patent: Feb. 21, 2017

(54) METHOD OF MAKING A LARGE AREA GRAPHENE COMPOSITE MATERIAL

(71) Applicant: Lockheed Martin Corporation

(72) Inventors: Steven Edward Bullock, Canton, GA (US); Clinton M. Newell, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 325 days.

(21) Appl. No.: 14/028,862

(22) Filed: Sep. 17, 2013

(65) Prior Publication Data
US 2015/0079340 A1    Mar. 19, 2015

(51) Int. Cl.
| | |
|---|---|
| *B29C 65/00* | (2006.01) |
| *C08K 3/04* | (2006.01) |
| *B32B 37/00* | (2006.01) |
| *B32B 37/14* | (2006.01) |
| *B32B 37/20* | (2006.01) |

(Continued)

(52) U.S. Cl.
CPC .............. *C08K 3/04* (2013.01); *B29C 65/00* (2013.01); *B32B 3/20* (2013.01); *B32B 9/007* (2013.01); *B32B 9/045* (2013.01); *B32B 27/06* (2013.01); *B32B 27/08* (2013.01); *B32B 37/0076* (2013.01); *B32B 37/144* (2013.01); *B32B 37/146* (2013.01); *B32B 37/203* (2013.01); *B32B 38/00* (2013.01); *B32B 2038/0076* (2013.01); *B32B 2260/04* (2013.01); *B32B 2262/101* (2013.01); *B32B 2262/106* (2013.01); *B32B 2264/108* (2013.01); *B32B 2305/08* (2013.01); *B32B 2305/77* (2013.01); *B32B 2310/00* (2013.01); *B32B 2313/04* (2013.01);

(Continued)

(58) Field of Classification Search
None
See application file for complete search history.

(56) References Cited

U.S. PATENT DOCUMENTS

| | | | |
|---|---|---|---|
| 6,627,037 B1 * | 9/2003 | Kurokawa | ........ H01L 21/67132 |
| | | | 156/711 |
| 8,361,321 B2 | 1/2013 | Stetson et al. | |

(Continued)

FOREIGN PATENT DOCUMENTS

| | | | |
|---|---|---|---|
| CN | 103086372 A | | 5/2013 |
| KR | 20120083864 | * | 7/2012 |

OTHER PUBLICATIONS

International Search Report for PCT/US2014/055841, dated Dec. 8, 2014, 7 pages.

(Continued)

*Primary Examiner* — Edmund Lee
(74) *Attorney, Agent, or Firm* — Reising Ethington P.C.

(57) ABSTRACT

Large area graphene (LAG) sheets can be embedded in a polymer-based material as a mechanical reinforcement or to otherwise enhance the properties of the polymer-based material. The LAG sheets can be nanoperforated and/or functionalized to enhance interaction between the graphene and the polymer. Reactive functional groups can facilitate formation of covalent bonds between the graphene and the polymer so that the LAG sheets become an integral part of the cross-linked structure in curable polymer-based materials. Nanoperforations in the LAG sheets provide useful sites for the functional groups and can allow cross-links to form through the nanoperforations.

20 Claims, 2 Drawing Sheets

(51) Int. Cl.
*B32B 38/00* (2006.01)
*B32B 27/08* (2006.01)
*B32B 3/20* (2006.01)
*B32B 9/00* (2006.01)
*B32B 9/04* (2006.01)
*B32B 27/06* (2006.01)

(52) U.S. Cl.
CPC ........... *B32B 2398/00* (2013.01); *Y10T 156/10* (2015.01); *Y10T 428/24331* (2015.01)

(56) References Cited

U.S. PATENT DOCUMENTS

| | | | |
|---|---|---|---|
| 8,663,771 B2 * | 3/2014 | Winarski | G11B 7/2548 428/64.1 |
| 2007/0284557 A1 * | 12/2007 | Gruner | B82Y 30/00 252/500 |
| 2009/0200707 A1 * | 8/2009 | Kivioja | B82Y 10/00 264/293 |
| 2010/0310447 A1 | 12/2010 | Yaniv et al. | |
| 2011/0030991 A1 | 2/2011 | Veerasamy | |
| 2011/0048625 A1 * | 3/2011 | Caldwell | B82Y 30/00 156/233 |
| 2011/0049437 A1 | 3/2011 | Crain et al. | |
| 2011/0114897 A1 | 5/2011 | Aksay et al. | |
| 2011/0147647 A1 | 6/2011 | Yaniv et al. | |
| 2011/0165321 A1 | 7/2011 | Zhamu et al. | |
| 2011/0201201 A1 | 8/2011 | Arnold et al. | |
| 2011/0223405 A1 * | 9/2011 | Compton | B82Y 30/00 428/220 |
| 2011/0226960 A1 * | 9/2011 | Zhang | B82Y 30/00 250/440.11 |
| 2011/0315657 A1 * | 12/2011 | Cho | B32B 37/025 216/36 |
| 2012/0048804 A1 | 3/2012 | Stetson et al. | |
| 2012/0068122 A1 * | 3/2012 | Kranbuehl | B82Y 30/00 252/503 |
| 2012/0070612 A1 * | 3/2012 | Lee | B32B 9/007 428/141 |
| 2012/0132357 A1 * | 5/2012 | Shin | B32B 43/006 156/281 |
| 2012/0244333 A1 | 9/2012 | Aksay et al. | |
| 2012/0251881 A1 * | 10/2012 | Woehrle | H01M 4/133 429/217 |
| 2012/0301953 A1 | 11/2012 | Duan et al. | |
| 2013/0277573 A1 * | 10/2013 | Miller | H01J 37/26 250/440.11 |
| 2013/0299077 A1 * | 11/2013 | Hong | B82B 3/0076 156/249 |
| 2014/0127534 A1 * | 5/2014 | Winarski | G11B 7/2548 428/848 |

OTHER PUBLICATIONS

Hunt et al, Epoxide Speciation and Functional Group Distribution in Graphene Oxide Paper-Like Materials, Advanced Functional Materials, www.MaterialViews.com, 2012 Wiley-VCH Verlag GmbH & Co. KGaA, Weinheim 8 pages.

Ramanathan et al, Functionalized graphene sheets for polymer nanocomposites, Letter abstract, Correspondence to: L.C. Brinson, e-mail: ebrinson@northwestern.edu, 2 pages.

* cited by examiner

METHOD OF MAKING A LARGE AREA GRAPHENE COMPOSITE MATERIAL

TECHNICAL FIELD

This application relates generally to reinforced composite materials and, more particularly, to graphene-reinforced composite materials.

BACKGROUND

Polymeric materials, while desirable in many applications due to ease of processing, low tooling cost, and design freedom, are usually not as strong or rigid as non-polymeric materials, such as metals or ceramics. Polymer-based composites have been developed in which reinforcement materials, such as non-polymeric fibers, are embedded in a polymer matrix in an attempt to combine the desirable properties of the polymer with the higher stiffness and strength of the reinforcement material. Attempts to incorporate fullerenes such as carbon nanotubes into polymer-based composites as a reinforcement material, to realize the benefits of the high-strength all-carbon molecular structure of fullerenes, have been met with limited success due to problems with entanglement, folding, low affinity for the matrix material, changes in rheological properties and processability, or difficulty in properly orienting such reinforcements.

SUMMARY

According to one or more embodiments, a composite panel includes a layer of material comprising a polymeric matrix material. The composite panel also includes a large area graphene (LAG) sheet embedded in the layer of material, and the LAG sheet includes nanoperforations.

According to one or more embodiments, a composite panel includes a layer of material comprising a polymeric matrix material. The composite panel also includes a large area graphene (LAG) sheet embedded in the layer of material, and the polymer matrix material is covalently bonded with the LAG sheet.

According to one or more embodiments, a method of making a composite panel includes the step of embedding a large area graphene (LAG) sheet in a layer of material comprising a polymeric matrix material.

DETAILED DESCRIPTION

As described below, a composite material can be formed by embedding one or more large area graphene (LAG) sheets in a polymer-based material. This form of graphene may act as a mechanical reinforcement for the composite material or it may otherwise enhance the properties of the polymer-based material. The LAG sheets can be nanoperforated and/or functionalized to enhance interaction between the graphene and the polymer. Reactive functional groups can facilitate formation of covalent bonds between the graphene and the polymer so that the LAG sheets become an integral part of the cross-linked structure in curable polymer-based materials. Nanoperforations in the LAG sheets provide useful sites for the functional groups and can allow cross-links to form through the nanoperforations.

Figure 1:
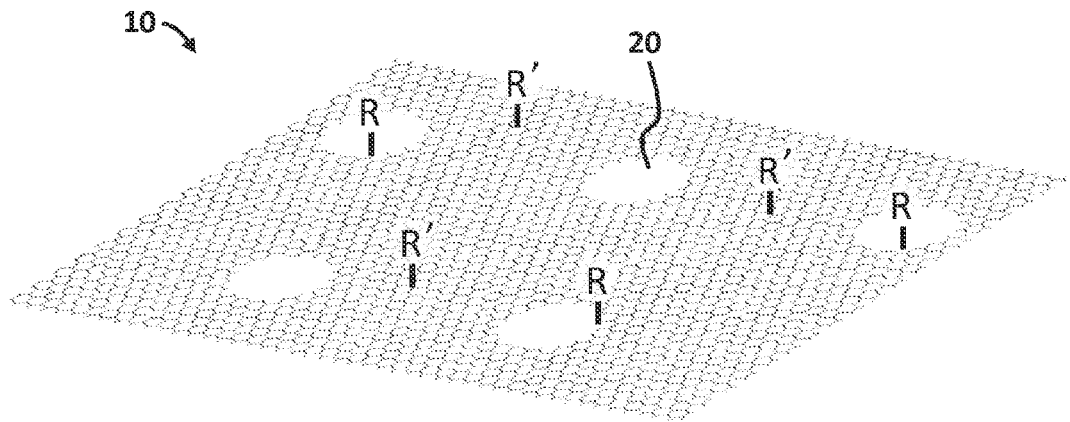
FIG. 1 depicts a portion of a large area graphene (LAG) sheet with nanoperforations and functional groups.

The composite material disclosed herein generally includes a polymer matrix material, a LAG sheet, and other optional constituents. FIG. 1 schematically illustrates a portion of an example of a large area graphene sheet 10. Graphene is a one-atom-thick planar structure of covalently bonded carbon atoms arranged in a hexagonal or honeycomb-like lattice, as is known. As used herein, a LAG sheet is a layer of graphene with planar dimensions on the order of several centimeters to one meter or larger. The LAG sheet 10 may include nanoperforations 20 and/or may be functionalized with one or more functional groups R, R'.

The nanoperforations 20 are on the nanoscale and range in size from 0.5 nm to 500 nm and preferably range in size from 1 nm to 200 nm. The nanoperforations 20 may be generally uniform in size or may vary in size within a single LAG sheet 10. The spacing between adjacent nanoperforations 20 is also on the nanoscale and may be uniform in some embodiments so that the nanoperforations are arranged in a regular pattern along the LAG sheet 10. The composite material may include a plurality of LAG sheets 10, and each LAG sheet can have differently sized and spaced nanoperforations and/or different nanoperforation size distributions. Suitable examples of nanoperforated graphene are described in U.S. Pat. No. 8,361,321 to Stetson et al., hereby incorporated by reference in its entirety.

One or more functional groups R may be located along edges of the nanoperforations 20, and one or more functional groups R' may be located between nanoperforations, as shown in FIG. 1. R and R' may be the same or different, and other functional groups, different from R and R', may be included along edges and/or between nanoperforations 20. The functional groups serve to promote integration of the LAG sheet within the polymer matrix material. In one embodiment, the LAG sheet 10 includes reactive functional groups designed to form covalent bonds with the polymer matrix material in a reaction with the polymer matrix material or in a reaction with a curing agent. In one example, the reactive functional groups include a carboxyl group, such as carboxyl acid. Carboxyl groups can be converted to anhydrides, which are also reactive functional groups, via thermal processing at about 200° C. in a vacuum. Other examples of reactive functional groups include epoxides and silsesquixoanes. Epoxides provide the LAG sheet with reactive sites for curing with amines, such as diphenyl tetramine, and anhydrides provide reactive sites for curing agents such as mellitic anhydride. Silsesquixoanes such as polyhedral oligomeric silsesquixoanes (POSS) can be tailored to provide functionality specific to the chemistry of the polymer matrix material and each silsesquixoane can include a plurality of reactive sites. Other examples of suitable functional groups include hydroxyl groups and moieties that include a urethane linkage. Urethane linkages may be particularly useful in certain flexible composite applications where the polymer matrix material also includes urethane groups.

Where the polymer matrix material is a curable material, such as an epoxy, reactive functional groups facilitate integration of the graphene sheet 10 with the polymer matrix material by incorporating the graphene into the cross-linked polymer network in the cured material with covalent bonds. Thus, the full strength of the covalently bonded carbon mesh of graphene can be imparted to the composite material, unlike with traditional reinforcing materials that must rely on low reinforcement surface energy, chemical compatibility, and/or weaker bond types (e.g., hydrogen bonding) for load transfer between the matrix material and the reinforcement. In some embodiments, at least some of the functional groups are non-reactive functional groups selected to function as a wetting agent or compatibilizer that does not covalently bond with the polymer matrix material. For instance, the functional groups may include polar moieties where the LAG sheet 10 is intended for use in a polymer matrix material having polar groups in its repeating unit. A mixture of reactive and non-reactive functional groups may be employed along the LAG sheet 10, with the ratio of the two types of functional groups tailored to achieve the desired amount of covalent bonding of the LAG sheet with the matrix material.

The nanoperforations 20 provide ideal locations for functionalization of the LAG sheet 10 since the carbon atoms located along the nanoperforation edges are not bonded with three other carbon atoms and are thus more readily available for functionalization. However, the nanoperforations 20 provide some advantages even in the absence of functional groups. In some embodiments, the LAG sheet 10 is not intentionally functionalized. In one example, the polymer matrix material is a curable material that forms cross-links when cured, and some of the cross-links extend through the nanoperforations 20 from one side of the LAG sheet 10 to the opposite side of the LAG sheet, effectively creating an interpenetrating network through the graphene on a nanoscale. The LAG sheet 10 is thus locked in place on a molecular level within the cross-linked polymer network without covalent bonds between the graphene and the polymer matrix material. The LAG sheet 10 may also be embedded in a thermoplastic polymer matrix material and include functional groups and/or nanoperforations designed to integrate the graphene into the matrix material in similar fashion. In another example, thermoplastic monomers may be used to infiltrate the LAG sheet. Polymerization of the infiltrated LAG results in a similar interpenetrating network structure. In another example, in-situ polymerization of the polymer matrix material can be carried out in a resin transfer molding (RTM) or similar process, such as vacuum-assisted RTM (VARTM), that is compatible with casting methods for thermoplastics (e.g., cast acrylic).

Figure 2:
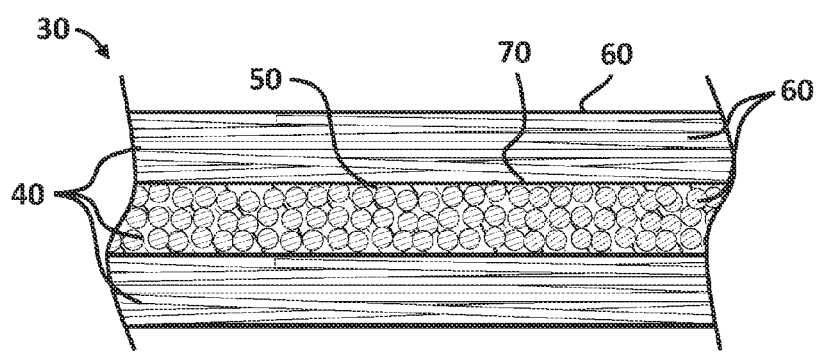
FIG. 2 is a cross-sectional view of an embodiment of a composite panel in which the nanoperforated and functionalized LAG sheet of FIG. 1 may be embedded.

FIG. 2 is a schematic cross-sectional view of an exemplary composite panel 30 including the above-described LAG sheet. As the LAG sheet is only one atomic layer thick, it is it not explicitly shown in FIG. 2. The illustrated composite panel 30 includes a plurality of layers of material 40, and each layer of material includes the polymer matrix material 50. In this particular example, each layer of material also includes long or continuous fiber reinforcements 60, such as carbon tows or glass fibers. In some embodiments, the fiber reinforcements are omitted. In the illustrated panel 30, adjacent layers 40 have the reinforcements oriented perpendicular with one another. The top and bottom layers 40 of FIG. 2 show the lengthwise side of the reinforcements 60, and the middle layer shows the ends of the reinforcements. The polymer matrix material 50 is best shown in the middle layer but is also present in the other layers. The reinforcements 60 are embedded in the matrix material 50 in each layer 40. Alternatively, where, as in this case, the reinforcements 60 make up a large volumetric portion of each material layer 40, the fiber reinforcements may be considered impregnated with the polymer matrix material 50, particularly when uncured. The reinforcements 60 may take other forms, such as shorter, chopped fibers or particulate fillers. Other examples of suitable reinforcements include glass tows, pre-woven carbon or glass fabrics, and randomly oriented non-woven carbon or glass fibers. Other forms and material types (e.g., Kevlar, natural fibers, etc.) are possible and may be used together in various combinations.

The above-described LAG sheet may be embedded in the polymer matrix material anywhere within the thickness of the composite panel 30. For example, the LAG sheet may be embedded in the polymer matrix material at or near an outermost surface 70 of the panel 10, at or near an interface 80 between adjacent material layers 40, or within the thickness of one of the material layers 40. The composite panel 30 may have any number of embedded LAG sheets, and each LAG sheet may include nanoperforations. In the finished composite panel 30, the polymer matrix material 50 may be covalently bonded with the LAG sheet. The covalent bonds between the matrix material 50 and the LAG sheet are located along nanoperforation edges, along the length of the LAG sheet between nanoperforations, or both. As described in some of the examples above, the matrix material 50 may be covalently bonded with the LAG sheet via anhydride linkages, epoxide linkages, urethane linkages, or silsesquixoane linkages, to name a few.

Figure 3:
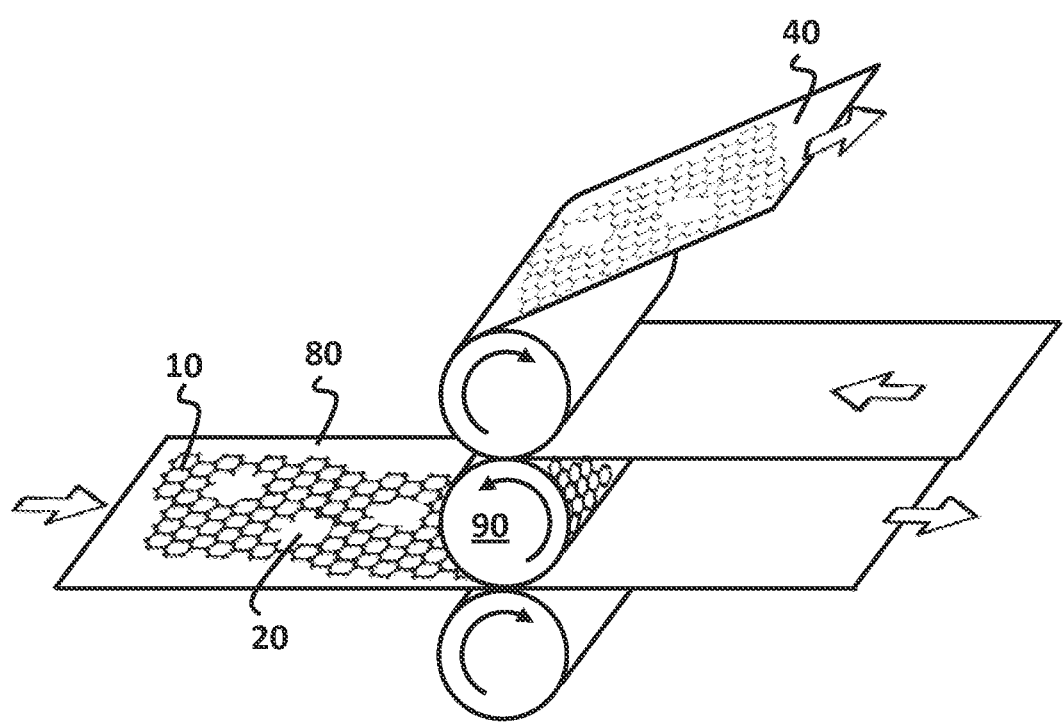
FIG. 3 is a schematic view of part of an exemplary method of making a composite panel with an embedded LAG sheet, including a roll-to-roll process.

FIG. 3 illustrates part of an exemplary method of making the above-described composite panel. The illustrated method includes use of a roll-to-roll process, where the LAG sheet 10 is transferred from a substrate or carrier 80 to a layer of material 40. In the example of FIG. 3, the LAG sheet 10 is provided on a continuous metal foil 80 and contacts a transfer roller 90, and the LAG sheet is transferred to the transfer roller. The metal foil carrier 80 may be heated during the process to facilitate graphene transfer. The separately provided layer of material 40 is brought into contact with the LAG sheet 10 on the transfer roller 90, and the LAG sheet is transferred to the layer of material 40. An additional roller may be provided as shown to guide the layer of material 40 into a sufficient transfer location and condition. In one embodiment, the layer of material comprises a reinforced or unreinforced curable polymer matrix material that is partially cured in the manner of a pre-preg material. Multiple layers of such material can be cut to size and stacked together to form a thicker layer of the polymer matrix material with multiple LAG sheets 10 intercalated within its thickness. Optionally, long or continuous fiber reinforcements can be interposed between the LAG sheet-containing layers when they are stacked together. The stacked layers may then be treated in the manner of traditional pre-preg materials—i.e., formed and cured in the desired shape. In one embodiment, the polymer matrix material is a curable material, and forming covalent bonds between the matrix material and the LAG sheet occurs during curing of the polymer matrix material. Other processes are possible to embed the LAG sheet in the polymer matrix material. For example, the LAG sheet may be supported by a carrier, and a layer of material comprising the polymer matrix material may be deposited over the LAG sheet in an extrusion or spraying process.

The LAG sheet 10 illustrated in FIG. 3 already includes nanoperforations 20 when presented to the layer of material 40 (as is apparent, the graphene and nanoperforations are greatly enlarged for purposes of illustration). The LAG sheet 10 is also functionalized when presented to the layer of material 40, where functional groups are desired. When both nanoperforations 20 and functional groups are desired, it is preferred that the nanoperforations are formed first so that at least some of the functional groups can be located along nanoperforation edges. The nanoperforated LAG sheet can be functionalized during gas exchange or in nitrogen plasma.

The embedded LAG sheet may provide the composite panel with advantageous properties instead of or in addition to strength. Specific properties of the composite panel can be targeted, such as gas permeation or barrier properties, weatherability, oxidation resistance, glass transition temperature ($T_g$), and decomposition temperature, to name a few.

It is to be understood that the foregoing is a description of one or more illustrative embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of making a composite panel, comprising the steps of:
   embedding a large area graphene (LAG) sheet in a layer of material comprising a polymeric matrix material;
   functionalizing the LAG sheet with reactive functional groups before the step of embedding; and
   reacting the polymer matrix material with at least some of the reactive functional groups to form covalent bonds between the LAG sheet and the polymer matrix material.

2. The method of claim 1, wherein the reactive functional groups include anhydrides, epoxides, silsesquixoanes, carboxyl groups, or any combination thereof.

3. The method of claim 1, further comprising the step of forming nanoperforations through the LAG sheet before the step of embedding.

4. The method of claim 3, wherein the functional groups are attached to carbon atoms of the LAG sheet located along edges of the nanoperforations.

5. The method of claim 1, further comprising the step of embedding long or continuous fiber reinforcements in the polymeric matrix material.

6. The method of claim 1, wherein the polymer matrix material is a curable material and the method further comprises the steps of curing the polymer matrix material and simultaneously forming the covalent bonds between the LAG sheet and the polymer matrix material.

7. The method of claim 1, wherein the polymer matrix material is a thermoplastic material and the method further comprises the steps of heating and consolidating the polymer matrix material and simultaneously forming the covalent bonds between the LAG sheet and the polymer matrix.

8. The method of claim 1, wherein the step of embedding comprises the steps of infiltrating the LAG sheet with a monomer and polymerizing the monomer to form the polymer matrix material, wherein the covalent bonds are formed between the LAG sheet and the polymer matrix material during polymerization.

9. A method of making a composite panel, comprising the step of embedding a large area graphene (LAG) sheet in a layer of material comprising a polymeric matrix material such that the polymer matrix material is present at both opposite faces of the LAG sheet.

10. The method of claim 9, wherein the LAG sheet includes nanoperforations.

11. The method of claim 10, wherein the LAG sheet has functional groups attached to carbon atoms of the LAG sheet located along edges of the nanoperforations.

12. The method of claim 9, wherein covalent bonds are formed between the LAG sheet and the polymer matrix material.

13. The method of claim 12, wherein the LAG sheet includes nanoperforations.

14. The method of claim 13, wherein at least some of the covalent bonds between the LAG sheet and the polymer matrix material are located along edges of the nanoperforations.

15. The method of claim 12, wherein the polymer matrix material is a curable material and the method further comprises the steps of curing the polymer matrix material and simultaneously forming the covalent bonds between the LAG sheet and the polymer matrix material.

16. The method of claim 12, wherein the polymer matrix material is a thermoplastic material and the method further comprises the steps of heating and consolidating the polymer matrix material and simultaneously forming the covalent bonds between the LAG sheet and the polymer matrix.

17. The method of claim 12, wherein the step of embedding comprises the steps of infiltrating the LAG sheet with a monomer and polymerizing the monomer to form the polymer matrix material, wherein the covalent bonds are formed between the LAG sheet and the polymer matrix material during polymerization.

18. The method of claim 12, wherein the LAG sheet is functionalized with reactive functional groups before the step of embedding so that the polymer matrix material reacts with at least some of the reactive functional groups to form the covalent bonds between the LAG sheet and the polymer matrix material.

19. The method of claim 18, wherein the reactive functional groups include anhydrides, epoxides, silsesquixoanes, carboxyl groups, or any combination thereof.

20. The method of claim 9, further comprising the step of embedding long or continuous fiber reinforcements in the polymeric matrix material.

* * * * *